UNITED STATES PATENT OFFICE.

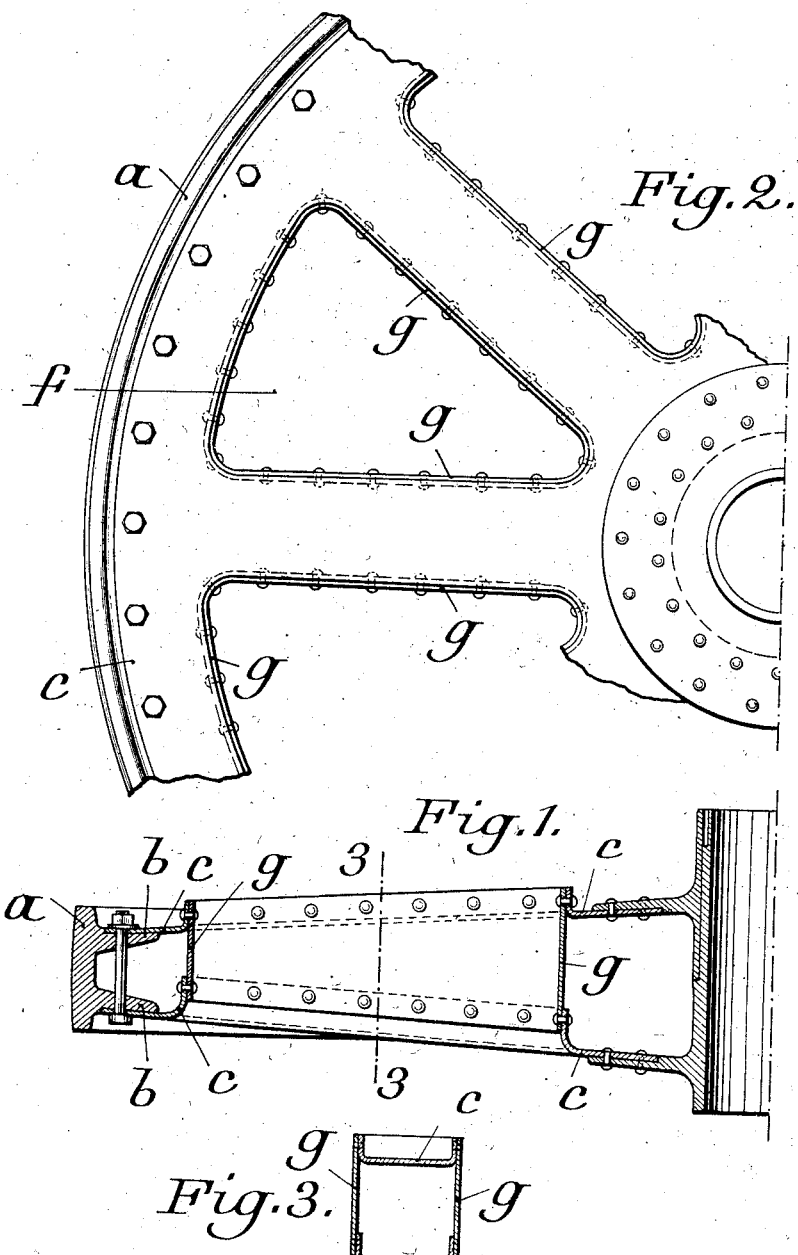

KARL VÖLLER, OF DUSSELDORF, GERMANY.

WHEEL.

1,037,812.	Specification of Letters Patent.	Patented Sept. 3, 1912.

Application filed December 29, 1910. Serial No. 599,897.

*To all whom it may concern:*

Be it known that I, KARL VÖLLER, engineer, a subject of the German Emperor, residing at 12 Scharnhorststrasse, Dusseldorf, Germany, have invented certain new and useful Improvements in Wheels; and I do hereby declare the following to be a full, clear, and exact description of the invention, such as will enable others skilled in the art to which it appertains to make and use the same.

The primary object of this invention is to provide a metal wheel for heavy ordnance which may be provided with as many spokes and intervening recesses between the spokes as conditions may require, and which wheel will be of such strength as to dispense with the use of firing wheels now in use and avoid the necessity of special foundations for the gun bases, and which will, furthermore, be adapted for transporting the gun under all circumstances.

Metallic wheels for heavy ordnance must be capable of withstanding high stresses and not liable to be rendered inoperative by injuries caused by shocks or shots even if a portion should be torn away. As against such stresses a wooden wheel is ineffective, and steel wheels as now made are unsatisfactory, primarily because it is not possible to form such wheels with as many spokes and intervening openings as may be desired.

A further object is to construct a metallic wheel which will have the greatest possible resistance obtainable with reference to the general construction of the wheel; and also to so construct and arrange the parts and secure them together that each increases the efficiency of the others, with the result that the weight of the wheel is not materially above that of the ordinary wooden wheels and yet which notwithstanding its comparatively low weight will answer the necessary requirements both as to strength and durability.

The invention will be hereinafter fully set forth and particularly pointed out in the claims.

In the accompanying drawings, Figure 1 is a vertical cross-section of half of the wheel taken on a plane which passes through the axis of the wheel. Fig. 2 is a partial side view of the wheel, and Fig. 3 is a cross-section of the spokes taken on the line 3—3, of Fig. 1.

The body or central part of the wheel comprising the hub connecting portion, the spokes, and the tire connecting portion, consists of spaced apart sheet metal side plates $c$ which are arranged any desired distance apart. These plates are formed with cutouts to form inner and outer circular bands and radial spoke members. At the cut-out portions the margins of one of the plates are bent inwardly, and the margins of the other plate are bent outwardly, thereby producing flanges which are perpendicular to the plates. To these flanges transverse plates $g$ are secured for forming rigid connections between the side plates along the entire margins of the cut-outs from the hub connecting portions to the rim connecting portions. These transverse plates are perpendicular to the plane of the wheel, and they may be of any desired length according to the space it is desired to maintain between the side plates. Thus the spokes, which are composed of the radial walls or spoke members and the transverse plates, are, as shown in Fig. 3 in cross-section, like a hollow beam, all four walls being formed of substantially straight plates, corresponding plates being perpendicular to the other corresponding plates. Therefore, the resistance of the spokes is large relatively to both symmetrical axes.

The transverse connecting plates $g$ strengthen the wheels as against longitudinal and transverse stresses as well as against injury. Any stress upon one of the side plates or a transverse plate is transmitted to the other plates. Thus a stress upon any portion of the wheel is exerted over the entire wheel. In consequence, the sheet metal may be comparatively thin, and the weight of the body of the wheel comparatively small. By connecting the side plates in the manner stated it is possible to form the wheel with any desired number of spokes, and also with intervening recesses of any desired size. By reason of the described construction the wheel will still be effective even if the body is injured at one or more points, or even should one of these spokes be entirely destroyed.

An encircling band $a$ combines the function of a rim and tire. It is composed of metal and is formed with two inwardly directed flanges $b$ by means of which it is secured to the side plates $c$ between which the flanges project. That portion of the wheel body formed by the circular bands of the side plates is U-shaped in cross-section so as to obtain a large resistance in the direction of the plane of the wheel as well as perpendicularly thereto.

By connecting the rim band *a* to the side plates *c* a wheel is obtained of relatively low weight, and possessing durability and strength as against stresses in any direction relatively to the plane of the wheel.

I claim as my invention:—

1. A sheet metal wheel composed of spaced apart side plates each having cut-outs extending from near the hub connecting portion to the rim connecting portion thereof to form inner and outer continuous circular bands and flat spaced-apart spoke members connecting said bands, said plates along the margins of said cut-outs having flanges, transverse flat plates arranged perpendicularly to the plane of the wheel extending continuously around said cut-outs and united to said flanges of the side plates to form spokes in connection with said spoke members of the side plates, a tire rim surrounding and connected to the outer circular bands of said side plates, and a hub to which the inner circular bands of said plates are connected.

2. A sheet metal wheel composed of spaced apart side plates each having cut-outs extending from near the hub connecting portion to the rim connecting portion thereof to form inner and outer continuous circular bands and spoke members connecting said bands, said plates along the margins of said cut-outs having flanges, the flanges of one plate being directed inwardly and the flanges of the other plate directed outwardly, transverse plates arranged perpendicularly to the plane of the wheel extending continuously around said cut-outs and united to said flanges of the side plates to form spokes in connection with said spoke members of the side plates, a tire rim surrounding and connected to the outer circular bands of said side plates, and a hub to which the inner circular bands of said plates are connected.

3. A sheet metal wheel composed of spaced apart side plates each having cut-outs extending from near the hub connecting portion to the rim connecting portion thereof to form inner and outer continuous circular bands and flat spaced-apart spoke members connecting said bands, said spoke members along the margins of said cut-outs having flanges, flat transverse plates arranged perpendicularly to the plane of the wheel and united to said flanges of the spoke members, a tire rim surrounding and secured to said outer circular bands, and a hub to which the inner circular bands of said plates are connected.

In testimony whereof, I have signed this specification in the presence of two subscribing witnesses.

KARL VÖLLER. [L. S.]

Witnesses:
CHAS. J. WRIGHT,
ALFRED HENKEL.